United States Patent
Bhagwat et al.

(10) Patent No.: US 9,419,937 B2
(45) Date of Patent: Aug. 16, 2016

(54) SYSTEM AND METHOD FOR DYNAMICALLY CONFIGURING A DNS SERVER IN A VIRTUAL NETWORK ENVIRONMENT

(71) Applicant: VMWARE, INC., Palo Alto, CA (US)

(72) Inventors: Abhinav Vijay Bhagwat, Pune (IN); Aravind Srinivasan, Pune (IN); Amit Ratnapal Sangodkar, Pune (IN)

(73) Assignee: VMware, Inc., Palo Alto, CA (US)

( * ) Notice: Subject to any disclaimer, the term of this patent is extended or adjusted under 35 U.S.C. 154(b) by 287 days.

(21) Appl. No.: 14/207,853

(22) Filed: Mar. 13, 2014

(65) Prior Publication Data

US 2015/0215276 A1  Jul. 30, 2015

(30) Foreign Application Priority Data

Jan. 29, 2014  (IN) .............................. 410/CHE/2014

(51) Int. Cl.
*G06F 15/16* (2006.01)
*H04L 29/12* (2006.01)

(52) U.S. Cl.
CPC ......... *H04L 61/2015* (2013.01); *H04L 61/1552* (2013.01); *H04L 61/2503* (2013.01); *H04L 61/305* (2013.01)

(58) Field of Classification Search
USPC .................. 709/220, 246, 228, 222, 225, 245
See application file for complete search history.

(56) References Cited

U.S. PATENT DOCUMENTS

| | | | |
|---|---|---|---|
| 8,909,780 B1 | 12/2014 | Dickinson et al. | |
| 2007/0094411 A1* | 4/2007 | Mullane | H04L 29/12066 709/245 |
| 2009/0300178 A1 | 12/2009 | Saunderson et al. | |
| 2010/0302974 A1* | 12/2010 | Niiyama | G07C 5/085 370/254 |
| 2012/0117241 A1 | 5/2012 | Witt et al. | |
| 2012/0173742 A1* | 7/2012 | Noldus | H04L 29/12132 709/228 |
| 2012/0297037 A1* | 11/2012 | Kumagai | H04L 12/4641 709/222 |
| 2013/0132545 A1 | 5/2013 | Schultze et al. | |
| 2013/0311991 A1 | 11/2013 | Li et al. | |
| 2014/0130044 A1 | 5/2014 | Zhang et al. | |
| 2015/0052522 A1 | 2/2015 | Chanda et al. | |
| 2015/0120911 A1 | 4/2015 | Devnath et al. | |

* cited by examiner

*Primary Examiner* — Jude Jean Gilles

(57) ABSTRACT

Techniques for dynamic configuration of a domain name system (DNS) server in a virtual network environment are described. In one example embodiment, DNS rules are configured using virtual machine (VM) inventory objects and associated DNS names. Further, the configured DNS rules are transformed by replacing the VM inventory objects in the configured DNS rules with associated Internet protocol (IP) addresses using an IP address management (IPAM) table or a network address translation (NAT) table and the DNS names in the configured DNS rules with modified DNS names using a zone table and a view table. Furthermore, the transformed DNS rules are sent to the DNS server for performing domain name resolutions associated with multiple VMs running on a plurality of host computing systems in a computing network.

27 Claims, 4 Drawing Sheets

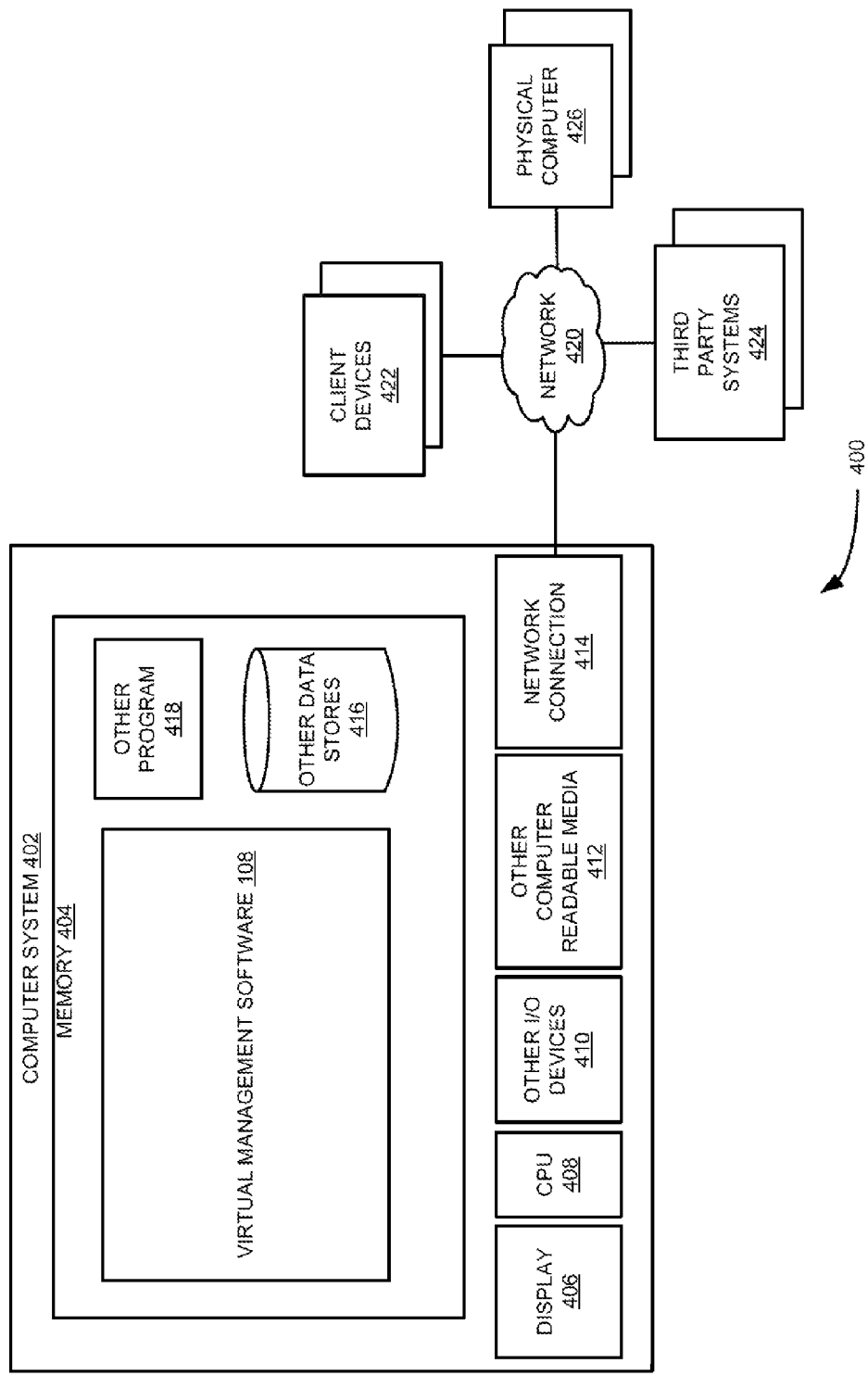

SYSTEM AND METHOD FOR DYNAMICALLY CONFIGURING A DNS SERVER IN A VIRTUAL NETWORK ENVIRONMENT

RELATED APPLICATIONS

Benefit is claimed under 35 U.S.C. 119(a)-(d) to Foreign application Serial No. 410/CHE/2014 filed in India entitled "SYSTEM AND METHOD FOR DYNAMICALLY CONFIGURING A DNS SERVER IN A VIRTUAL NETWORK ENVIRONMENT", filed on Jan. 29, 2014, by VMware, INC., which is herein incorporated in its entirety by reference for all purposes.

TECHNICAL FIELD

The present disclosure relates generally to a domain name system (DNS) server in a virtual network environment and, more particularly, to dynamically configuring the DNS server based on any updates made to network services in the virtual network environment.

BACKGROUND

In computer networking, domain name system (DNS) is a name resolution protocol for transmission control protocol (TCP)/Internet protocol (IP) networks, such as the Internet. Typically, a DNS server located in a data path resolves a DNS query, received from a client device (e.g., a host computing system, a mobile device and the like) in a network, by returning one or more IP addresses corresponding to a domain name associated with a remotely located computing resource, such as a remote server, a host computing system and the like. In other words, the DNS server translates domain names into IP addresses and keeps information about location and the IP addresses of remotely located computing resources transparent to users. Information is ordinarily transmitted within the networks in packets and the term packet refers to a unit of data communicated within a network. A packet typically includes a packet source identifier and a packet destination identifier used to navigate the packet data through a network. The term packet may refer to a unit of data through a network. The term packet may refer to a unit of data communicated at any level of an open systems interconnection (OSI) model and between levels of the OSI model.

Generally, the DNS server translates domain names into IP addresses based on DNS rules. A network administrator ordinarily configures the DNS rules using the IP addresses associated with the domain names of the remotely located computing resources within a file. One challenge with defining the DNS rules in terms of the IP addresses is the need for the administrator to continually update the DNS rules to keep abreast of changes in a network. Machines may be added or removed from the network and machines' IP addresses can change from time to time, requiring corresponding changes to the DNS rules.

Further, in complex networks in which changes are many and frequent, the need to update the DNS rules to keep pace with changes to network configuration, such as user configured DNS rules, network interface card (NIC) assigned IP addresses in an IP address management (IPAM) table, network address translation (NAT) addresses in a NAT table, virtual machine (VM) inventory objects, a zone table, a view table and the like can pose a significant challenge. This is even more a challenge in a virtual network environment where VMs may be dynamically added and/or removed in which case the DNS server may need to be manually reconfigured.

BRIEF DESCRIPTION OF THE DRAWINGS

FIG. 4 is a block diagram of an example computing system for dynamically configuring the DNS server, such as the one shown in FIG. 1, according to an example embodiment.

DETAILED DESCRIPTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Embodiments described herein provide enhanced computer-based and network-based methods, techniques, and systems for dynamic configuration of a domain name system (DNS) server in a virtual network environment. A DNS manager residing in a management plane maps DNS rules including virtual machine (VM) inventory objects and associated DNS names to Internet Protocol (IP) addresses and modified DNS names, respectively, and dynamically configures the DNS server located in a data plane based on the mapping information. Basically, the technique involves replacing the VM inventory objects in the DNS rules using VM identifiers and machine attributes, such as network address translation (NAT) assigned IP addresses from a NAT table or network interface card (NIC) assigned IP addresses from an IP address management (IPAM) table. One skilled in the art can envision that IP addresses of the VMs can also be obtained using methods, such as a dynamic host configuration protocol (DHCP). Further, the technique involves determining the modified DNS names using a zone table and a view table. Using this technique allows the DNS server to be dynamically updated anytime VMs are added, changed or reconfigured.

Further, utility value of configuring the DNS rules using the VM inventory objects to an administrator is enhanced by significantly reducing the need for the administrator to manually revisit the DNS rules and make corresponding changes to the DNS rules whenever a new VM is added to the system, an existing VM is removed from the system or every time the IP address changes. Furthermore, by using the VM inventory objects and/or grouping the VM inventory objects based on their attributes, the DNS manager updates the DNS rules dynamically anytime there are any changes in the IP addresses or DNS names.

System Overview and Examples of Operation

Figure 1:
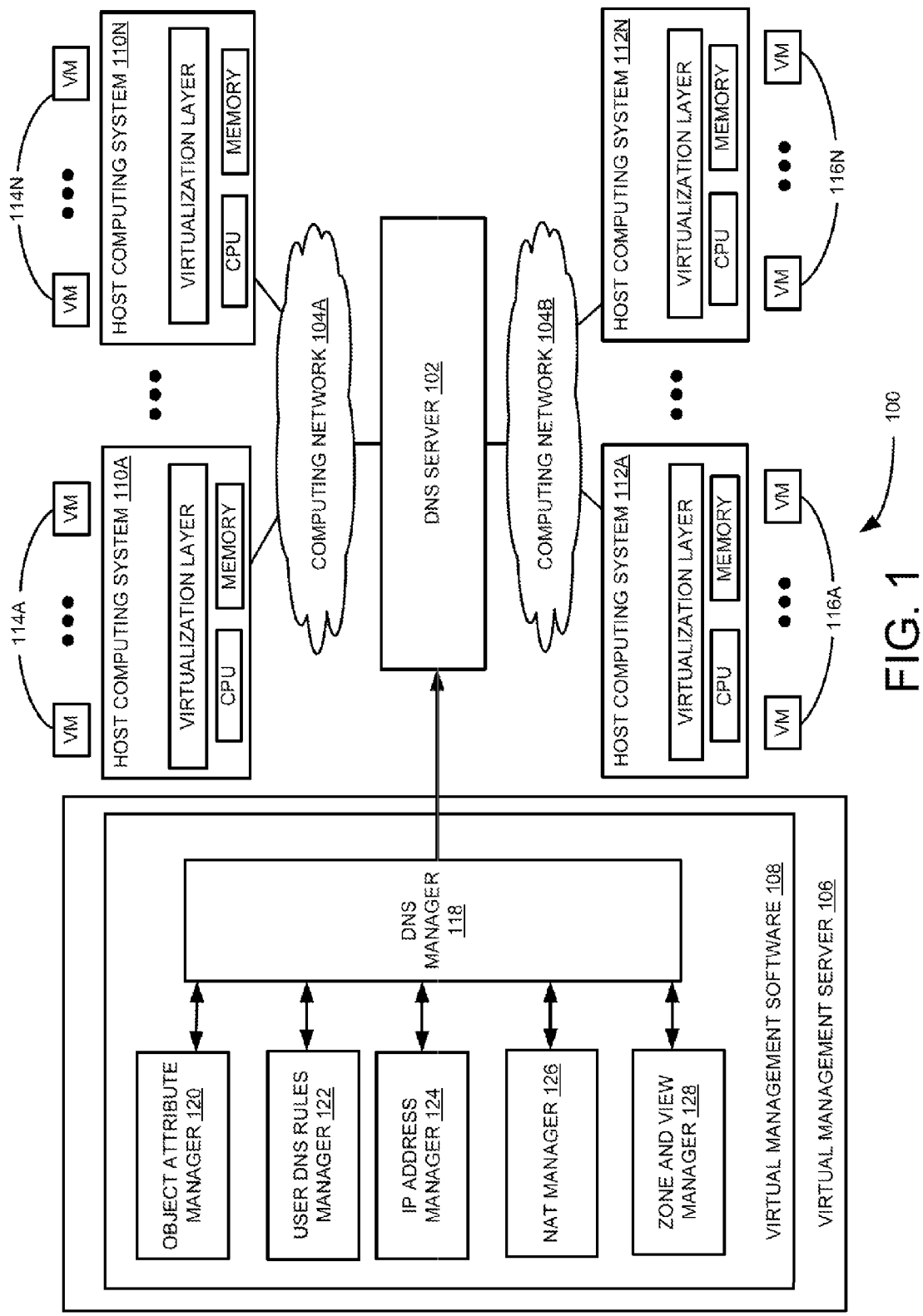
FIG. 1 is a block diagram that illustrates using dynamically collaborated and managed network services for dynamic configuration of a domain name system (DNS) server in a virtual network environment, according to an example embodiment.

FIG. 1 is a block diagram that illustrates using dynamically collaborated and managed network services for dynamic configuration of a DNS server in virtual network environment 100, according to an example embodiment. In the example shown in FIG. 1, virtual network environment 100 includes plurality of host computing systems 110A-N and plurality of VMs 114A-N, respectively, hosted by host computing systems 110A-N. Further, virtual network environment 100 includes plurality of host computing systems 112A-N and plurality of VMs 116A-N, respectively, hosted by host computing systems 112A-N. Also as shown in FIG. 1, virtual network environment 100 includes computing networks 104A and 104B and DNS server 102. Further as shown in FIG. 1, host computing systems 110A-N are communicatively coupled to DNS server 102 via computing network 104A. Similarly as shown in FIG. 1, host computing systems 112A-N are communicatively coupled to DNS server 102 via computing network 104B.

Also as shown in FIG. 1, virtual network environment 100 includes virtual management server 106. Further as shown in FIG. 1, virtual management server 106 includes virtual management software 108 to provide any needed automated operations management and proactive performance management and to gain visibility across the physical and virtual infrastructures. Furthermore as shown in FIG. 1, virtual management software 108 includes DNS manager 118, object attribute manager 120, user DNS rules manager 122, IP address manager 124, NAT manager 126, and zone and view manager 128. In addition as shown in FIG. 1, DNS manager 118 is communicatively coupled to DNS server 102. One skilled in the art can envision that virtual management software 108 can include one or more DNS managers, one for each computing network, that are communicatively coupled to DNS server 102. Similarly, there can be one or more DNS servers that are communicatively coupled to one DNS manager.

Figure 2:
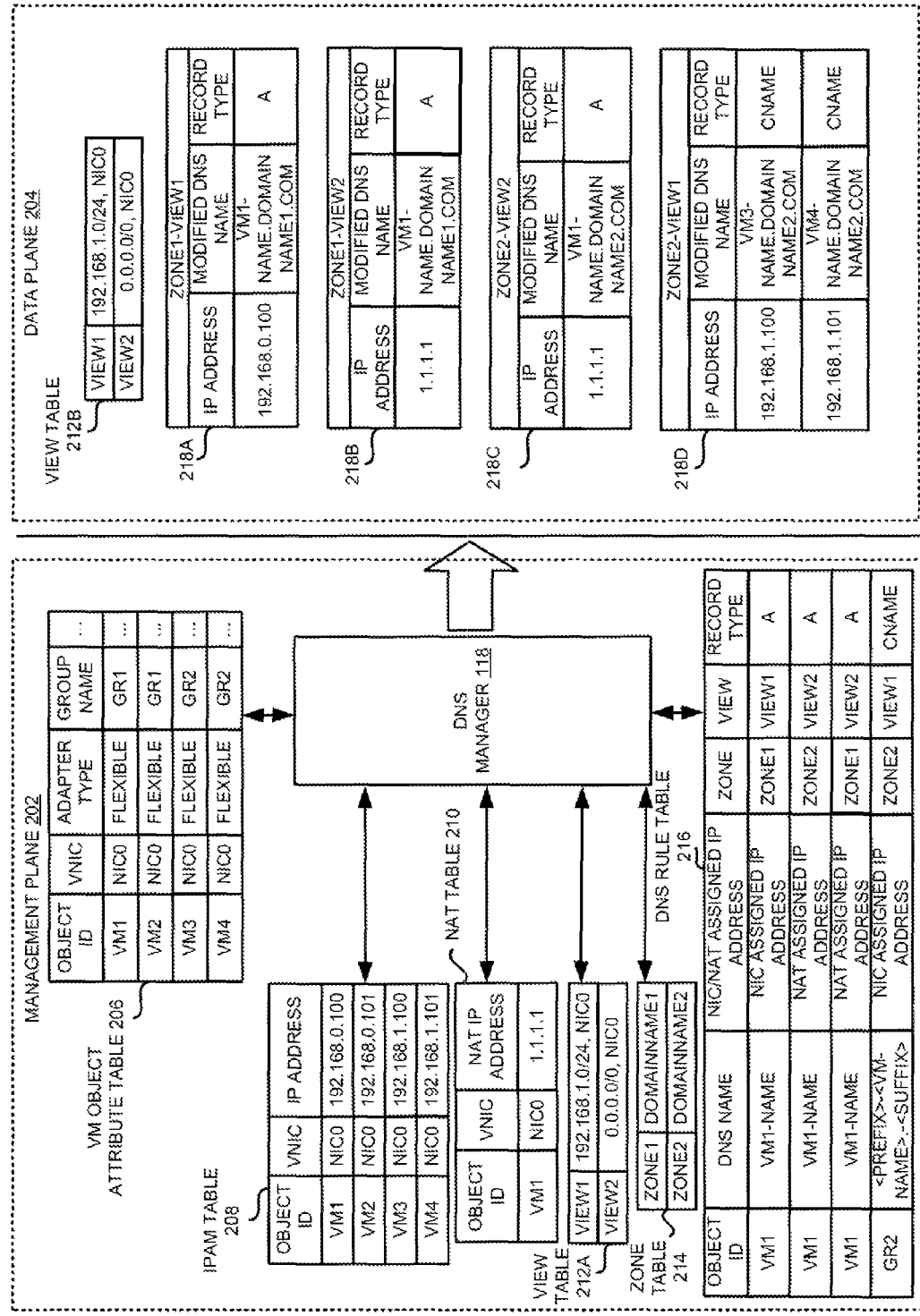
FIG. 2 is a block diagram of a communication system that includes multiple components associated with the dynamically collaborated and managed network services and a dynamically configurable DNS server to impose DNS rules based on interaction with different components of the communication system, according to an example embodiment.

In operation, DNS manager 118 configures DNS rules using VM inventory objects from VM object attribute table 206 (shown in FIG. 2) via object attribute manager 120 and associated DNS names. For example, VM object attribute table 206 is a table used for storing information associated with the VM inventory objects. In this example, the VM inventory objects are a collection of virtual objects, such as VMs, virtual network interface cards (vNICs) and the like. In one example, DNS manager 118 configures the DNS rules using the VMs, the vNICs, and/or groups of VMs and associated DNS names. In this example, the groups of VMs are formed statically or dynamically by grouping two or more of the VMs based on common attributes, such as a group name, a network name/identifier, a datacenter name, an operating system, inventory folders, resource pools, VM tags, memory/processors, and so on. For example, table 216 in FIG. 2 illustrates the configured DNS rules including the VM inventory objects and associated DNS names. In other words, table 216 is a user configured DNS rule table where a user defines DNS names for a VM or group of VMs. In one example, the DNS names can be formed based on static values or dynamic values that can be given in form of a variable expression. The variables in such expression can be object attributes. For example, in one of the entries in DNS rule table 216, the DNS name is formed based on <VM-Name> of each VM. Further, table 216 includes zone, view and record type attributes associated with the DNS names.

DNS manager 118 then transforms the configured DNS rules by replacing the VM inventory objects in the configured DNS rules with associated IP addresses using IPAM table 208 or NAT table 210. In one embodiment, if the configured DNS rules are specified using NIC assigned IP addresses, then DNS manager 118 replaces any of the VM inventory objects specified in the configured DNS rules with assigned IP addresses of the VM inventory objects using IPAM table 208 via IP address manager 124. Further in this embodiment, if the configured DNS rules are specified using NAT assigned IP addresses, then DNS manager 118 replaces any of the remaining VM inventory objects specified in the configured DNS rules with NAT IP addresses of the VM inventory objects using NAT table 210 via NAT manager 126.

In another embodiment, DNS manager 118 determines the IP addresses associated with the VM inventory objects using IPAM table 208 or NAT table 210 based on the view attributes specified in DNS rule table 216. In other words, DNS manager 118 determines the IP addresses serving the DNS names based on the view attributes, in table 216, using view table 212A. DNS manager 118 then replaces the VM inventory objects in the configured DNS rules with the determined IP addresses. For example shown in FIG. 2. DNS manager 118 determines an IP address associated with a VM inventory object from IPAM table 208 when the view attribute in table 216 is specified as view 1, which is having a subnet of 192.168.1.0/24. Further as shown in FIG. 2, DNS manager 118 determines an IP address associated with a VM inventory object from NAT table 210 when the view attribute in table 216 is specified as view 2, which is having a subnet of 0.0.0.0/0.

Further in operation, DNS manager 118 transforms the DNS names in the configured DNS rules with modified DNS names using view table 212A and zone table 214. In other words, DNS manager 118 transforms the DNS names in the configured DNS rules with the modified DNS names based on the view and zone attributes using view table 212A and zone table 214, respectively, via zone and view manager 128. In one embodiment, DNS manager 118 determines domain names associated with the DNS names based on the zone attributes and view attributes, in table 216, using zone table 214 and view table 212A, respectively, via zone and view manager 128. DNS manager 118 then determines the modified DNS names based on attributes (e.g., object attributes) specified in the DNS names and the domain names associated with the DNS names. DNS manager 118 then replaces the DNS names in the configured DNS rules with the modified DNS names. In this embodiment, zone table 214 is a table used for storing zone attributes and domain names associated with the DNS names and view table 212A is a table used for storing view attributes and IP addresses serving the DNS names.

DNS manager 118 then sends the transformed DNS rules to DNS server 102 for performing domain name resolutions associated with VMs 114A-N and/or VMs 116A-N running on host computing systems 110A-N and host computing systems 112A-N, respectively. In these embodiments, DNS server 102 is configured for performing domain name resolutions associated with VMs residing on the same or different host computing systems. In one embodiment, the transformed DNS rules are represented in multiple configuration tables 218A-D in data plane 204 based on the zone and view attributes in table 216. For example, tables 218A-D include actual system configured DNS rules using which DNS server 102 performs domain name resolutions associated with VMs 114A-N and/or VMs 116A-N running on host computing systems 110A-N and host computing systems 112A-N, respectively. In some embodiments, data plane 204 includes view table 212B. In these embodiments, view table 212B is a table used for storing associated view attributes and IP addresses serving the DNS names. For example, VM1, VM2, VM3, and VM4 shown in FIG. 2, are object identities (IDs) of any of VMs 114A-N and VMs 116A-N.

DNS manager 118 then determines whether there are any updates made to the configured DNS rules in table 216, the VM inventory objects in VM object attribute table 206, IPAM table 208. NAT table 210, zone table 214, and/or view table 212A. For example, the update may include addition of a VM, deletion of a VM, change in a network property of a vNIC, addition/deletion of a vNIC to a VM, change of VM's assigned IP address, change of VM's NAT IP address, addition/change of attributes of a VM, addition/deletion of a zone in a domain, addition/deletion of a view and/or change in configured DNS rules. In this example, the change in configured DNS rules may include addition of a DNS rule, deletion of a DNS rule and/or update of a DNS rule in which a VM inventory object referenced changes.

In these embodiments, DNS manager 118 can determine the updates for other tables or the other sub components. Further, VMs 114A-N and VMs 116A-N or host computing systems 110A-N and host computing systems 112A-N running VMs 114A-N and VMs 116A-N, respectively, or virtual management server 106 may proactively send an update to DNS manager 118 when there is any change in their respective configurations. If there are any updates made to the configured DNS rules in table 216, the VM inventory objects in VM object attribute table 206, IPAM table 208, NAT table 210, zone table 214, and/or view table 212A, DNS manager 118 dynamically updates the transformed DNS rules sent to DNS server 102 by repeating the steps of configuring, transforming and sending to DNS server 102. If there are no updates made to the configured DNS rules in table 216, the VM inventory objects in VM object attribute table 206, IPAM table 208, NAT table 210, zone table 214, and/or view table 212A, DNS manager 118 continues the step of determining whether there are any updates made to the configured DNS rules in table 216, the VM inventory objects in VM object attribute table 206, IPAM table 208. NAT table 210, zone table 214, and/or view table 212A. In these embodiments, object attribute manager 120, user DNS rules manager 122, IP address manager 124, NAT manager 126, and zone and view manager 128 dynamically maintain updates made to the VM inventory objects in VM object attribute table 206, the configured DNS rules in table 216, IPAM table 208, NAT table 210, and/or zone table 214 and/or view table 212A, respectively.

Similarly, DNS server 102 can be dynamically configured using physical objects, such as host computing systems or physical machines for performing domain name resolutions associated with the host computing systems or the physical machines, respectively, in a physical network environment.

Also, although certain terms are used primarily herein, other terms could be used interchangeably to yield equivalent embodiments and examples. For example, the term "changes" may be used interchangeably with "updates", "revisions" or the like. Further for example, it is well-known that equivalent terms in the field of system virtualization or similar or related fields could be substituted for such terms as "physical computer," "hypervisor," "virtual machine," or the like. The term IPAM refers to planning, tracking, and managing the Internet Protocol address space used in a network. Also the term, NAT refers to the process of modifying IP address information in IPv4/IPv6 headers while in transit across a traffic routing device, i.e., providing a one-to-one translation of IP addresses.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

Figure 3:
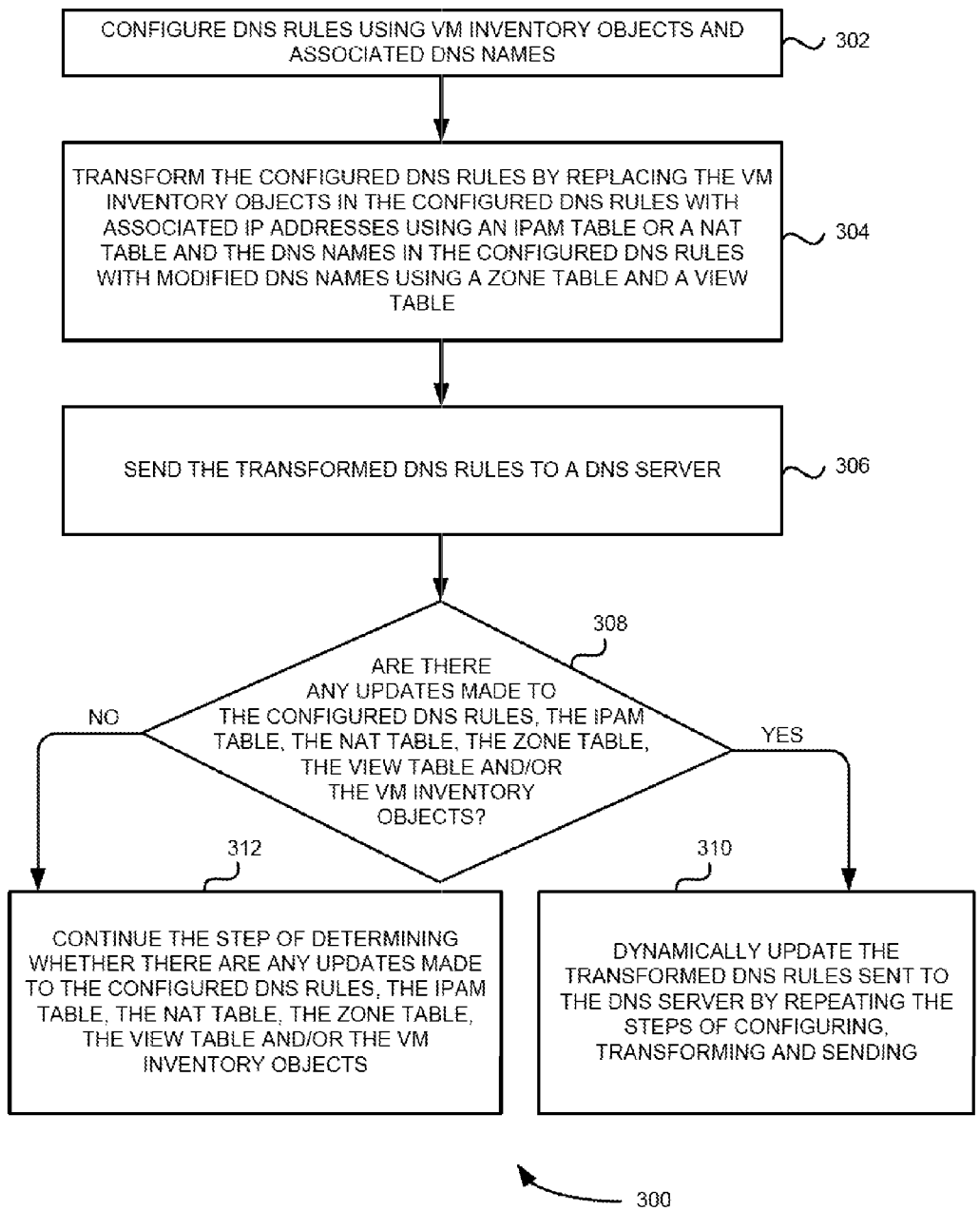
FIG. 3 is a flow diagram of a process for dynamically configuring a DNS server in a virtual network environment, according to an example embodiment.

FIG. 3 is a flow diagram 300 of a process for dynamically configuring a DNS server in a virtual network environment, according to an example embodiment. At block 302, DNS rules are configured using VM inventory objects and associated DNS names. For example, the VM inventory objects include virtual objects, such as VMs and/or vNICs. In one embodiment, the DNS rules are configured using the VMs, groups of VMs, and/or the vNICs and the associated DNS names. At block 304, the configured DNS rules are transformed by replacing the VM inventory objects in the configured DNS rules with associated IP addresses using an IPAM table or a NAT table and the DNS names in the configured DNS rules with modified DNS names using a zone table and a view table. In one embodiment, any of the VM inventory objects specified in the configured DNS rules are replaced with assigned IP addresses of the VM inventory objects using the IPAM table, if the configured DNS rules specify using NIC assigned IP addresses. Further in this embodiment, any of remaining VM inventory objects specified in the configured DNS rules are replaced with NAT IP addresses of the VM inventory objects using the NAT table, if the configured DNS rules specify using NAT assigned IP addresses. In another embodiment, the IP addresses associated with the VM inventory objects are determined using the IPAM table or the NAT table based on view attributes specified in the configured DNS rules. In other words, the IP addresses serving the DNS names are determined based on the view attributes using the view table. The VM inventory objects in the configured DNS rules are then replaced with the determined IP addresses.

In some embodiments, domain names associated with the DNS names are determined using the zone table and the view table. Further, the modified DNS names are determined based on attributes specified in the DNS names and the domain names associated with the DNS names. Furthermore, the DNS names in the configured DNS rules are replaced with the modified DNS names.

At block 306, the transformed DNS rules are sent to the DNS server for performing domain name resolutions associated with multiple VMs running on a plurality of host computing systems in a computing network. At block 308, it is determined whether there are any updates made to the configured DNS rules, the IPAM table, the NAT table, the zone table, the view table and/or the VM inventory objects. For example, the update may include addition of a VM, deletion of a VM, change in a network property of a vNIC, addition/deletion of a vNIC to a VM, change of VM's assigned IP address, change of VM's NAT IP address, addition/change of attributes of a VM, addition/deletion of a zone in a domain, addition/deletion of a view and/or change in configured DNS rules. In this example, the change in configured DNS rules may include addition of a DNS rule, deletion of a DNS rule and/or update of a DNS rule in which a VM inventory object referenced changes.

At block 310, the transformed DNS rules sent to the DNS server are dynamically updated by repeating the steps of configuring, transforming and sending, if there are any updates made to the configured DNS rules, the IPAM table, the NAT table, the zone table, the view table and/or the VM inventory objects. At block 312, the step of determining whether there are any updates made to the configured DNS rules, the IPAM table, the NAT table, the zone table, the view table and/or the VM inventory objects is continued, if there are no updates made to the configured DNS rules, the IPAM table, the NAT table, the zone table, the view table and/or the VM inventory objects. Further in these embodiments, updates to the VM inventory objects, the IPAM table, the NAT table, the zone table, the view table and/or the configured DNS rules are dynamically maintained.

Example Computing System Implementation

FIG. 4 is a block diagram 400 of an example computing system for dynamically configuring a DNS server, such as the one shown in FIG. 1, according to an example embodiment. In particular, FIG. 4 shows computing system 402 that may be utilized to implement virtual management software 108, such as shown in FIG. 1.

Note that one or more general purpose virtual or physical computer systems suitably instructed may be used to implement virtual management software 108 including DNS manager 118 (shown in FIGS. 1 and 2). In addition, computing system 402 may comprise one or more distinct computing systems/devices and may span distributed locations. Furthermore, each block shown may represent one or more such blocks as appropriate to a specific embodiment or may be combined with other blocks. Also, virtual management software 108 including DNS manager 118 may be implemented in software, hardware, firmware, or in some combination to achieve the capabilities described herein.

In the embodiment shown, computing system 402 may comprise computer memory ("memory") 404, display 406, one or more Central Processing Units ("CPU") 408, Input/output (I/O) devices 410 (e.g., keyboard, mouse, etc.), other computer-readable media 412, and network connections 414. Virtual management software 108 is shown residing in memory 404. The components of virtual management software 108 may execute on one or more CPUs 408 and implement techniques described herein. Other code or programs 418 (e.g., an administrative interface, a Web server, and the like) and potentially other data repositories, such as data store 416, may also reside in memory 404, and execute on one or more CPUs 408. One or more of the components in FIG. 4 may not be present in any specific implementation. For example, some embodiments may not provide other computer readable media 412 or display 406.

Virtual management software 108 interacts via network 420 with client devices 422, physical computers 426, and/or third-party systems/applications 424. Network 420 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

As discussed above with reference to FIGS. 1 and 2, virtual management software 108 including DNS manager 118 dynamically configures DNS rules in the virtual network environment. The architecture shown in FIG. 4 may in some embodiments be partially or fully virtualized. For example, computer system 402 may be one or possibly many VMs executing on physical hardware and managed by a hypervisor, virtual machine monitor, or similar technology. Also, physical computers 426 may include virtualization logic to manage multiple VMs.

In an example embodiment, components/modules of virtual management software 108 are implemented using standard programming techniques. For example, virtual management software 108 may be implemented as a "native" executable running on CPU 408, along with one or more static or dynamic libraries. In other embodiments, virtual management software 108 may be implemented as instructions processed by a VM that executes as one of other programs 418.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

Furthermore, in some embodiments, some or all of the components of virtual management software 108 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable storage medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Further, from the foregoing it will be appreciated that, although specific embodiments have been described herein for purposes of illustration, various modifications may be made without deviating from the spirit and scope of this disclosure. For example, the methods, techniques, and systems for dynamic configuration of the DNS server in the virtual network environment are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for dynamic configuration of a domain name system (DNS) server in a virtual network environment, the method comprising:
   configuring DNS rules using virtual machine (VM) inventory objects and associated DNS names;
   transforming the configured DNS rules by replacing the VM inventory objects in the configured DNS rules with associated Internet protocol (IP) addresses using an IP address management (IPAM) table or a network address translation (NAT) table and the DNS names in the configured DNS rules with modified DNS names using a zone table and a view table; and
   sending the transformed DNS rules to the DNS server for performing domain name resolutions associated with multiple VMs running on a plurality of host computing systems in a computing network.

2. The method of claim 1, further comprising:
   determining whether there are any updates made to the configured DNS rules, the IPAM table, the NAT table, the zone table, the view table and/or the VM inventory objects;
   if so, dynamically updating the transformed DNS rules sent to the DNS server by repeating the steps of configuring, transforming and sending; and
   if not, continuing the step of determining whether there are any updates made to the configured DNS rules, the IPAM table, the NAT table, the zone table, the view table and/or the VM inventory objects.

3. The method of claim 2, further comprising:
   dynamically maintaining updates to the VM inventory objects, the IPAM table, the NAT table, the zone table, the view table and/or the configured DNS rules.

4. The method of claim 2, wherein the update comprises addition of a VM, deletion of a VM, change in a network property of a virtual network interface card (vNIC), addition/deletion of a vNIC to a VM, change of VM's assigned IP address, change of VM's NAT IP address, addition/change of attributes of a VM, addition/deletion of a zone in a domain, addition/deletion of a view and/or change in configured DNS rules and wherein the change in configured DNS rules is addition of a DNS rule, deletion of a DNS rule and/or update of a DNS rule in which a VM inventory object referenced changes.

5. The method of claim 1, wherein replacing the VM inventory objects in the configured DNS rules with the associated IP addresses using the IPAM table or the NAT table, comprises:
   replacing any of the VM inventory objects specified in the configured DNS rules with assigned IP addresses of the VM inventory objects using the IPAM table, if the configured DNS rules specify using network interface card (NIC) assigned IP addresses; and
   replacing any of remaining VM inventory objects specified in the configured DNS rules with NAT IP addresses of the VM inventory objects using the NAT table, if the configured DNS rules specify using NAT assigned IP addresses.

6. The method of claim 1, wherein replacing the VM inventory objects in the configured DNS rules with the associated IP addresses using the IPAM table or the NAT table, comprises:
   determining the IP addresses associated with the VM inventory objects using the IPAM table or the NAT table based on view attributes specified in the configured DNS rules; and
   replacing the VM inventory objects with the determined IP addresses.

7. The method of claim 1, wherein replacing the DNS names in the configured DNS rules with the modified DNS names using the zone table and the view table, comprises:
   determining domain names associated with the DNS names using the zone table and the view table;
   determining the modified DNS names based on attributes specified in the DNS names and the domain names associated with the DNS names; and
   replacing the DNS names in the configured DNS rules with the modified DNS names.

8. The method of claim 1, wherein the VM inventory objects comprise virtual objects and wherein the virtual objects include VMs and/or vNICs.

9. The method of claim 8, wherein configuring the DNS rules using the VM inventory objects and associated DNS names, comprises:
   configuring the DNS rules using the VMs, groups of VMs, and/or the vNICs and the associated DNS names.

10. A system, comprising:
    a plurality of host computing systems hosting multiple virtual machines (VMs) in a computing network;
    a domain name system (DNS) server communicatively coupled to the plurality of host computing systems; and
    a virtual management server, comprising:
       a DNS manager to dynamically configure the DNS server in a virtual network environment, by:
          configuring DNS rules using VM inventory objects and associated DNS names;
          transforming the configured DNS rules by replacing the VM inventory objects in the configured DNS rules with associated Internet protocol (IP) addresses using an IP address management (IPAM) table or a network address translation (NAT) table and the DNS names in the configured DNS rules with modified DNS names using a zone table and a view table; and
          sending the transformed DNS rules to the DNS server for performing domain name resolutions associated with the multiple VMs running on the plurality of host computing systems in the computing network.

11. The system of claim 10, wherein the DNS manager is further configured to:
    determine whether there are any updates made to the configured DNS rules, the IPAM table, the NAT table, the zone table, the view table and/or the VM inventory objects;
    if so, dynamically update the transformed DNS rules sent to the DNS server by repeating the steps of configuring, transforming and sending; and
    if not, continue the step of determining whether there are any updates made to the configured DNS rules, the IPAM table, the NAT table, the zone table, the view table and/or the VM inventory objects.

12. The system of claim 11, wherein the DNS manager is further configured to:
   dynamically maintain updates to the VM inventory objects, the IPAM table, the NAT table, the zone table, the view table and/or the configured DNS rules.

13. The system of claim 11, wherein the update comprises addition of a VM, deletion of a VM, change in a network property of a virtual network interface card (vNIC), addition/deletion of a vNIC to a VM, change of VM's assigned IP address, change of VM's NAT IP address, addition/change of attributes of a VM, addition/deletion of a zone in a domain, addition/deletion of a view and/or change in configured DNS rules and wherein the change in configured DNS rules is addition of a DNS rule, deletion of a DNS rule and/or update of a DNS rule in which a VM inventory object referenced changes.

14. The system of claim 10, wherein the DNS manager is configured to:
   replace any of the VM inventory objects specified in the configured DNS rules with assigned IP addresses of the VM inventory objects using the IPAM table, if the configured DNS rules specify using network interface card (NIC) assigned IP addresses; and
   replace any of remaining VM inventory objects specified in the configured DNS rules with NAT IP addresses of the VM inventory objects using the NAT table, if the configured DNS rules specify using NAT assigned IP addresses.

15. The system of claim 10, wherein the DNS manager is configured to:
   determine the IP addresses associated with the VM inventory objects using the IPAM table or the NAT table based on view attributes specified in the configured DNS rules; and
   replace the VM inventory objects with the determined IP addresses.

16. The system of claim 10, wherein the DNS manager is configured to:
   determine domain names associated with the DNS names using the zone table and the view table;
   determine the modified DNS names based on attributes specified in the DNS names and the domain names associated with the DNS names; and
   replace the DNS names in the configured DNS rules with the modified DNS names.

17. The system of claim 10, wherein the VM inventory objects comprise virtual objects and wherein the virtual objects include VMs and/or vNICs.

18. The system of claim 17, wherein the DNS manager configures the DNS rules using the VMs, groups of VMs, and/or the vNICs and the associated DNS names.

19. A non-transitory computer-readable storage medium including instructions that are configured, when executed by a computing device, to perform a method for dynamic configuration of a domain name system (DNS) server in a virtual network environment, the method comprising:
   configuring DNS rules using virtual machine (VM) inventory objects and associated DNS names;
   transforming the configured DNS rules by replacing the VM inventory objects in the configured DNS rules with associated Internet protocol (IP) addresses using an IP address management (IPAM) table or a network address translation (NAT) table and the DNS names in the configured DNS rules with modified DNS names using a zone table and a view table; and
   sending the transformed DNS rules to the DNS server for performing domain name resolutions associated with multiple VMs running on a plurality of host computing systems in a computing network.

20. The non-transitory computer-readable storage medium of claim 19, further comprising:
   determining whether there are any updates made to the configured DNS rules, the IPAM table, the NAT table, the zone table, the view table and/or the VM inventory objects;
   if so, dynamically updating the transformed DNS rules sent to the DNS server by repeating the steps of configuring, transforming and sending; and
   if not, continuing the step of determining whether there are any updates made to the configured DNS rules, the IPAM table, the NAT table, the zone table, the view table and/or the VM inventory objects.

21. The non-transitory computer-readable storage medium of claim 20, further comprising:
   dynamically maintaining updates to the VM inventory objects, the IPAM table, the NAT table, the zone table, the view table and/or the configured DNS rules.

22. The non-transitory computer-readable storage medium of claim 20, wherein the update comprises addition of a VM, deletion of a VM, change in a network property of a virtual network interface card (vNIC), addition/deletion of a vNIC to a VM, change of VM's assigned IP address, change of VM's NAT IP address, addition/change of attributes of a VM, addition/deletion of a zone in a domain, addition/deletion of a view and/or change in configured DNS rules and wherein the change in configured DNS rules is addition of a DNS rule, deletion of a DNS rule and/or update of a DNS rule in which a VM inventory object referenced changes.

23. The non-transitory computer-readable storage medium of claim 19, wherein replacing the VM inventory objects in the configured DNS rules with the associated IP addresses using the IPAM table or the NAT table, comprises:
   replacing any of the VM inventory objects specified in the configured DNS rules with assigned IP addresses of the VM inventory objects using the IPAM table, if the configured DNS rules specify using network interface card (NIC) assigned IP addresses; and
   replacing any of remaining VM inventory objects specified in the configured DNS rules with NAT IP addresses of the VM inventory objects using the NAT table, if the configured DNS rules specify using NAT assigned IP addresses.

24. The non-transitory computer-readable storage medium of claim 19, wherein replacing the VM inventory objects in the configured DNS rules with the associated IP addresses using the IPAM table or the NAT table, comprises:
   determining the IP addresses associated with the VM inventory objects using the IPAM table or the NAT table based on view attributes specified in the configured DNS rules; and
   replacing the VM inventory objects with the determined IP addresses.

25. The non-transitory computer-readable storage medium of claim 19, wherein replacing the DNS names in the configured DNS rules with the modified DNS names using the zone table and the view table, comprises:
   determining domain names associated with the DNS names using the zone table and the view table;
   determining the modified DNS names based on attributes specified in the DNS names and the domain names associated with the DNS names; and
   replacing the DNS names in the configured DNS rules with the modified DNS names.

26. The non-transitory computer-readable storage medium of claim 19,
   wherein the VM inventory objects comprise virtual objects and wherein the virtual objects include VMs and/or vNICs.

27. The non-transitory computer-readable storage medium of claim 26, wherein configuring the DNS rules using the VM inventory objects and associated DNS names, comprises:
   configuring the DNS rules using the VMs, groups of VMs, and/or the vNICs and the associated DNS names.

* * * * *